(12) United States Patent
Tsugawa et al.

(10) Patent No.: US 9,897,034 B2
(45) Date of Patent: *Feb. 20, 2018

(54) CONTROL DEVICE OF AN ENGINE

(71) Applicant: Mazda Motor Corporation, Aki-gun, Hiroshima (JP)

(72) Inventors: Takeshi Tsugawa, Hiroshima (JP); Hiroki Morimoto, Hiroshima (JP); Nobuhiko Yokoyama, Hiroshima (JP); Shouichi Aiga, Hiroshima (JP); Yoshitomo Matsuo, Higashihiroshima (JP); Tomoaki Fujiyama, Iwakuni (JP); Yoshitaka Wada, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,204

(22) Filed: Jun. 15, 2016

(65) Prior Publication Data

US 2017/0009698 A1    Jan. 12, 2017

(30) Foreign Application Priority Data

Jul. 7, 2015    (JP) .................. 2015-136013

(51) Int. Cl.
*F02D 41/40* (2006.01)
*G01M 15/04* (2006.01)
(Continued)

(52) U.S. Cl.
CPC .......... *F02D 41/401* (2013.01); *F02B 23/104* (2013.01); *F02B 31/00* (2013.01);
(Continued)

(58) Field of Classification Search
CPC ...... F02D 37/02; F02D 41/401; F02D 41/402; F02M 61/04; F02M 61/14; F02B 31/00; G01M 15/042
(Continued)

(56) References Cited

U.S. PATENT DOCUMENTS 4,807,581 A * 2/1989 Nishikawa ............ F02D 41/045
                                                                        123/480
5,632,247 A    5/1997 Hashizume et al.
(Continued)

FOREIGN PATENT DOCUMENTS

JP    H08319931 A    12/1996
JP    2002339780 A    11/2002

*Primary Examiner* — John Kwon
*Assistant Examiner* — Johnny H Hoang
(74) *Attorney, Agent, or Firm* — Alleman Hall Creasman & Tuttle LLP

(57) ABSTRACT

Provided is a control device of an engine that can certainly suppress and avoid pre-ignition. A control device of an engine is an engine control device for controlling the behavior of fuel that is directly injected into a combustion chamber of a cylinder by a tumble flow, and it has an injector that directly injects the fuel into the combustion chamber, an intake port that generates the tumble flow in the combustion chamber, and an ECU that injects the fuel from the injector at a plurality of injection timings including an intake-stroke-early-half injection timing that is set at an early half of the intake stroke of the cylinder, when an operating state of the engine is in a high-load, low-rotation range.

14 Claims, 11 Drawing Sheets

(51) Int. Cl.
  *F02M 61/14* (2006.01)
  *F02D 37/02* (2006.01)
  *F02B 31/00* (2006.01)
  *F02B 23/10* (2006.01)
  *F02D 13/02* (2006.01)
  *F02D 41/38* (2006.01)
  *F02D 41/00* (2006.01)
  *F02B 75/12* (2006.01)

(52) U.S. Cl.
  CPC ......... *F02D 13/0207* (2013.01); *F02D 37/02* (2013.01); *F02D 41/402* (2013.01); *G01M 15/042* (2013.01); *F02B 2023/106* (2013.01); *F02B 2075/125* (2013.01); *F02B 2275/48* (2013.01); *F02D 2041/001* (2013.01); *F02D 2041/0015* (2013.01); *F02D 2041/389* (2013.01); *F02M 61/14* (2013.01); *Y02T 10/146* (2013.01); *Y02T 10/44* (2013.01)

(58) Field of Classification Search
  USPC ........................... 123/295–305; 701/103–105
  See application file for complete search history.

(56) References Cited

U.S. PATENT DOCUMENTS

| | | | |
|---|---|---|---|
| 2009/0271092 A1* | 10/2009 | Ashizawa | F02B 23/101 701/103 |
| 2010/0288236 A1* | 11/2010 | Ashizawa | F02B 23/10 123/478 |
| 2011/0060515 A1* | 3/2011 | Hirata | F02D 41/2454 701/106 |
| 2011/0226214 A1* | 9/2011 | Ogata | F02B 23/104 123/299 |
| 2014/0366850 A1* | 12/2014 | Ichihara | F02M 26/40 123/559.1 |
| 2015/0226143 A1* | 8/2015 | Iwai | F02B 23/101 123/294 |
| 2016/0356230 A1* | 12/2016 | Watanabe | F02D 41/064 |

* cited by examiner

INJECTOR SIDE ←————————————→ OPPOSITE INJECTOR SIDE

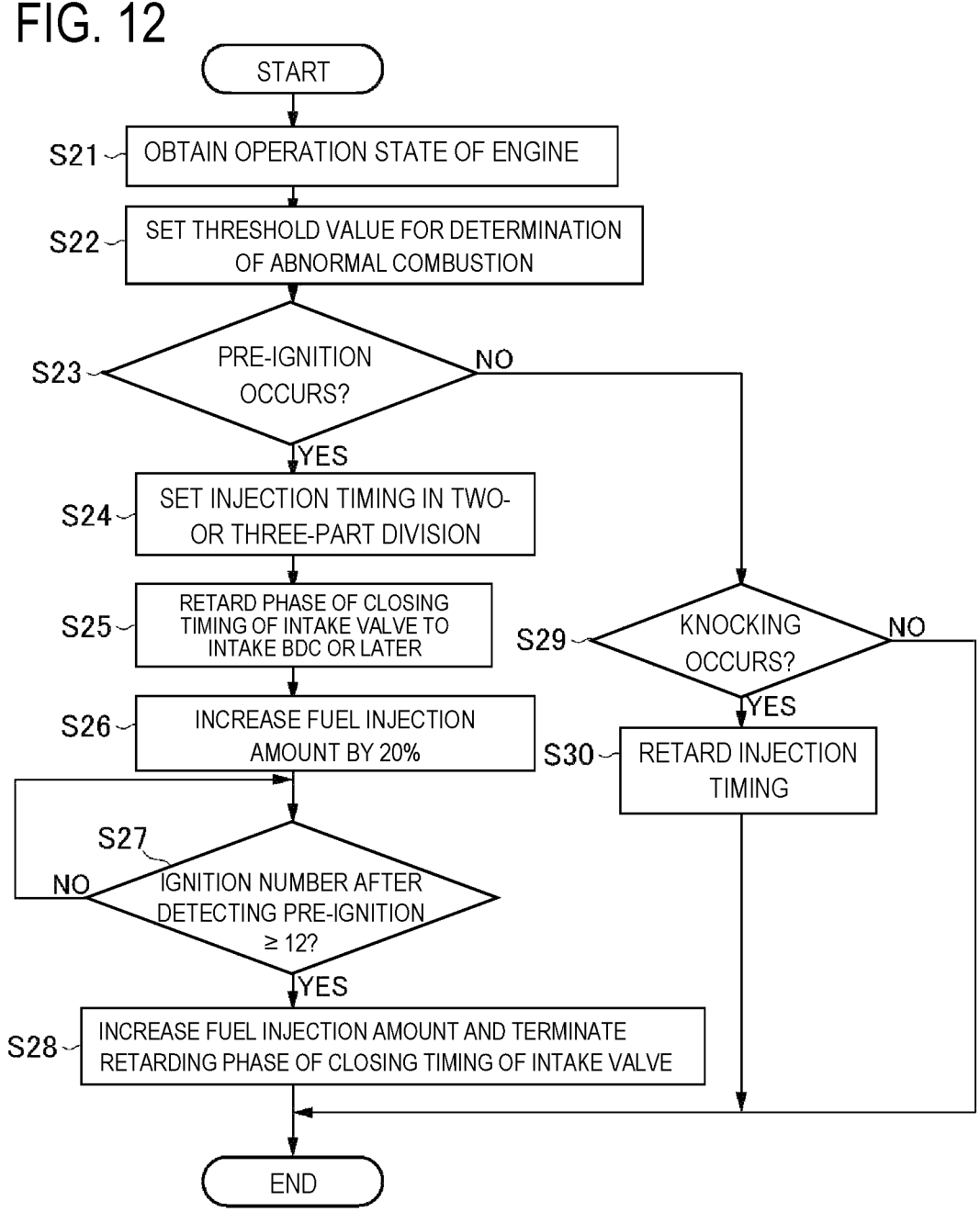

CONTROL DEVICE OF AN ENGINE

FIELD OF THE INVENTION

The present invention relates to a control device of an engine, especially a control device of the engine that controls behavior of fuel being directly injected into a combustion chamber in a cylinder by a tumble flow.

BACKGROUND ART

In recent years, in order to improve fuel saving performance without reducing power performance of a vehicle, a so-called downsizing concept has been applied to an engine with a supercharger to maintain power performance by supercharging by the supercharger, while improving fuel economy by making an exhaust amount of the engine smaller.

With this engine with the supercharger, since fresh air of a high temperature and high pressure, which is compressed by the supercharger, is taken into a combustion chamber, a cylinder inner pressure or a cylinder temperature easily become high compared to a naturally aspirated engine, and a so-called pre-ignition (abnormal combustion) in which an air fuel mixture in the combustion chamber spontaneously ignites before an ignition timing of the cylinder easily occurs. Once pre-ignition occurs, not only are noises or vibrations associated with sharply increasing the cylinder inner pressure generated, but also causing damage to the engine is possible due to continuous pre-ignition.

Therefore, early detection of pre-ignition and suppression of an occurrence of pre-ignition have been considered. For example, in a pre-ignition detection device described in Patent Document 1, pre-ignition is certainly detectable by determining that pre-ignition occurred when a difference between a timing when the occurrence of abnormal vibrations was detected and an ignition timing is equal to or less than a predetermined value. Moreover, according to Patent Document 2, in an operation range of a low rotation and a high load in which knocking easily occurs, since the time from the principal fuel injection of a compression stroke to the ignition timing is kept short by injecting a small amount of fuel during an intake stroke and injecting the remaining fuel (principal fuel injection) during the compression stroke, the possibility to avoid the occurrence of pre-ignition is indicated. Additionally, in a cylinder-direct-injection type internal combustion engine described in Patent Document 2, when the occurrence of pre-ignition is not detected or predicted, the fuel injection is performed in the intake stroke, and only when the occurrence of pre-ignition is detected or predicted, pre-ignition is avoided by retarding the fuel injection timing to the compression stroke.

RELATED ART

Patent Document

Patent Document 1 Japanese Unexamined Patent Application Publication No. H8-319931
Patent Document 2 Japanese Unexamined Patent Application Publication No. 2002-339780

SUMMARY OF THE INVENTION

Problems to be Solved by the Invention

Meanwhile, under the condition like the above in which pre-ignition easily occurs, knocking (a phenomenon in which unburned air fuel mixture spontaneously ignites after spark ignition of the air fuel mixture in the combustion chamber) can also occur; however, since the phenomena of pre-ignition and knocking are different and the necessary engine control contents to suppress and avoid them are also different, pre-ignition is required to be detected separately from knocking. However, in the conventional pre-ignition detection device described in the Patent Document 1, the occurrence of an abnormal vibration is detected simply when a vibration level detected by a vibration sensor exceeds a predetermined value. As it only determines that pre-ignition occurs when the difference between the detection timing and the ignition timing is equal to or less than the predetermined value, depending on an operating state of the engine, knocking with the vibration level exceeding a predetermined threshold value may occur or pre-ignition with the vibration level below the predetermined threshold value may occur. In these cases, there is a problem that an appropriate engine control to suppress and avoid pre-ignition cannot be performed.

Moreover, in the prior art described in Patent Document 2 mentioned above, when a majority of or a total amount of fuel injection is performed in the compression stroke at a high load operation time with a large fuel injection amount, part of the large amount of fuel injected adheres to a piston or a cylinder liner. When smoke generated by peeling off this adhered fuel (deposit) or the deposit itself is heated in the combustion chamber, it becomes an ignition source and accelerates pre-ignition.

The present invention has been made in order to solve the above described problems in prior arts and to provide a control device of an engine that can certainly suppress and avoid pre-ignition.

BRIEF SUMMARY OF THE INVENTION

In order to achieve the above mentioned purpose, a control device of an engine of the present invention is provided to control behavior of fuel that is directly injected into a combustion chamber of a cylinder, and comprises a fuel injection valve for directly injecting the fuel into the combustion chamber, a tumble flow generation means for generating a tumble flow into the combustion chamber, and a fuel injection valve control means for injecting the fuel from the fuel injection valve at a plurality of injection timings including an intake-stroke-early-half injection timing that is set at an early half of an intake stroke of the cylinder, when the operating state of the engine is in a high-load, low-rotation range. In the present invention configured in this way, the tumble flow is generated in the combustion chamber by the tumble flow generation means, and when the operating state of the engine is in the high-load, low-rotation range where pre-ignition easily occurs, the fuel injection valve control means injects the fuel at a plurality of the injection timings including the intake-stroke-early-half injection timing that is set at the early half of the intake stroke of the cylinder, so that a penetration force in an injection direction of the injected fuel is reduced by suppressing the fuel injection amount at each injection timing compared to a case when the fuel is injected in a batch, and thus the fuel adhesion to a piston or a cylinder liner can be reduced. Moreover, since the fuel injection is divided into multiple timings, the fuel can be injected at a timing that can reduce the fuel adhesion to the piston or the cylinder liner. Particularly, the fuel can be injected toward the tumble flow by injecting the fuel at the intake-stroke-early-half injection timing, so that the penetration force in the injection direction of the injected fuel is reduced by the kinetic energy of the tumble flow and the fuel adhesion to the cylinder liner can be reduced effectively. Thereby, the fuel adhesion that becomes an ignition source to accelerate pre-ignition can be certainly reduced and pre-ignition can be certainly suppressed and avoided Moreover, in the present invention, preferably the fuel injection valve control means injects the fuel at a plurality of the injection timings including the compression stroke injection timing set during the compression stroke of the cylinder when the operating state of the engine is in the high-load, low-rotation range.

In the present invention configured in this way, since fuel is injected at a plurality of the injection timings including the compression stroke injection timing when pre-ignition easily occurs, the inside of the combustion chamber can be cooled with a latent heat of vaporization of fuel by injecting fuel at the compression stroke, so that it is possible to have the state in which pre-ignition less easily occurs. Moreover, since pressure in the cylinder is relatively high at the compression stroke and the penetration force in the injection direction of the injected fuel is suppressed, the fuel adhesion to the cylinder liner can be reduced.

In addition, in the present invention, preferably the fuel injection valve control means injects the fuel at a plurality of the injection timings including an intake-stroke-latter-half injection timing that is set at a latter half of the intake stroke of the cylinder when the operating state of the engine is in the high-load, low-rotation range. In the present invention configured in this way, when pre-ignition easily occurs, since fuel is injected at a plurality of the injection timings including the intake-stroke-latter-half injection timing, fuel is injected at a timing in which the tumble flow generated at the early half of the intake stroke is expanded in a vertical direction with a descent of the piston and the fuel adhesion to the cylinder liner can be reduced by flowing the fuel in a spiral manner by continuation of the tumble flow, so that it is possible to have the state in which pre-ignition less easily occurs. Moreover, since a position of the piston at the compression stroke is relatively low and a distance between the fuel injection valve and a crown surface of the piston is relatively large, the fuel adhesion to the piston can be reduced.

Moreover, in the present invention, preferably the fuel injection valve control means injects the fuel toward a vortex center of the tumble flow at the intake-stroke-early-half injection timing. In the present invention configured in this way, by injecting fuel toward the vortex center of the tumble flow, the penetration force in the injection direction of the injected fuel is certainly reduced by the kinetic energy of the tumble flow, the fuel adhesion to the cylinder liner can be reduced effectively, and pre-ignition can be certainly suppressed and avoided.

Moreover, in the present invention, preferably the tumble flow generation means is an intake port of the engine, the fuel injection valve is arranged at the intake port side of a periphery of a ceiling of the combustion chamber and injects the fuel obliquely downward toward an exhaust port side of the engine from the intake port side, and a slope is formed on the piston crown surface of the engine to extend obliquely upward toward the fuel injection valve side from an end of a side apart from the fuel injection valve on the piston crown surface. In the present invention configured in this way, since fuel is injected toward the vortex center of the tumble flow above a lower part of the tumble flow, which flows obliquely upward toward the fuel injection valve side along the slope that extends from the end of the side apart from the fuel injection valve on the piston crown surface, fuel can be injected certainly toward the vortex center of the tumble flow, and thus the penetration force in the injection direction of the injected fuel is certainly reduced by the kinetic energy of tumble flow and the fuel adhesion to the cylinder liner can be reduced effectively.

Moreover, in the present invention, preferably the control device of the engine also has a pre-ignition detection means for detecting an occurrence of pre-ignition in which an air fuel mixture spontaneously ignites before the ignition timing of the cylinder and a variable valve timing mechanism for changing a valve timing of an intake valve of the engine, and when pre-ignition is detected by the pre-ignition detection means, the fuel injection valve control means increases the fuel injection amount of the fuel injection valve and the variable valve timing mechanism retards a closing timing of the intake valve to an intake bottom dead center or later. In the present invention configured in this way, when detecting pre-ignition, while the inside of the combustion chamber is cooled from the latent heat of vaporization of the increased fuel by increasing the fuel injection amount of the fuel injection valve, the temperature in the combustion chamber at the time of compression is decreased by retarding the closing timing of the intake valve to the intake bottom dead center or later and reducing an effective compression ratio, so that pre-ignition can be avoided effectively. In this manner, by increasing the fuel injection amount while retarding a phase of closing timing of the intake valve to the intake bottom dead center or later, a decrease of generated torque by decreasing the effective compression ratio can be offset by an increase of generated torque by increasing the fuel injection amount, and torque that is generated by the engine can be maintained substantially constant.

Moreover, in the present invention, preferably after detecting pre-ignition by the pre-ignition detection means, until performing a predetermined number of ignitions, the fuel injection valve maintains the increased fuel injection amount and the variable valve timing mechanism maintains the closing timing of the retarded intake valve. In the present invention configured in this way, after detecting pre-ignition, over a sufficient period of time until the predetermined number of ignitions are performed, the inside of the combustion chamber is sufficiently cooled, and the adhered fuel or smoke causing pre-ignition is completely scavenged, the fuel injection valve maintains the increased fuel injection amount and the variable valve timing mechanism maintains the closing timing of the retarded intake valve, so that the occurrence of pre-ignition is suppressed. Thus, when reverting the phase of the closing timing of the intake valve and the fuel injection amount, inducing larger pre-ignition, which is caused by the continuous occurrence of pre-ignition due to the high temperature in the combustion chamber or the residual of ignition sources such as adhered fuel or smoke, can be certainly prevented.

Moreover, in the present invention, preferably when the operating state of the engine is relatively out of the high-load, low-rotation range, the fuel injection valve control means injects the fuel at the injection timings including the intake stroke injection timing that is set at the intake stroke of the cylinder, and when the operating state of the engine is in the high-load, low-rotation range, the fuel injection valve control means injects the fuel at more injection timings than when the operating state of the engine is out of the high-load, low-rotation range. In the present invention configured in this way, when the operating state of the engine is in the high-load, low-rotation range and when pre-ignition easily occurs, the fuel injection valve control means injects the fuel at more injection timings than when the operating state of the engine is out of the high-load, low-rotation range and pre-ignition does not easily occur, so that compared to the case where the operating state is in the state in which pre-ignition does not easily occur, while the penetration force in the fuel injection direction is decreased by suppressing the fuel injection amount of each injection timing and the fuel adhesion to the piston or the cylinder liner can be reduced, the fuel can be injected at the timing in which the fuel adhesion to the piston or the cylinder liner is reducible.

Effects of the Invention

The control device of the engine according to the present invention can certainly suppress and avoid pre-ignition.

BRIEF DESCRIPTION OF THE DRAWINGS

FIG. 3A is a top plan view of the piston and FIG. 3B is a view taken along a line A-A of FIG. 3A.

FIG. 12 is a flow chart of a control performed by the control device of the engine according to a second embodiment of the present invention.

DETAILED DESCRIPTION OF THE EMBODIMENTS

Hereinafter, with reference to the accompanying drawings, a control device of an engine according to an embodiment of the present invention will be explained.

Device Configuration

Figure 1:
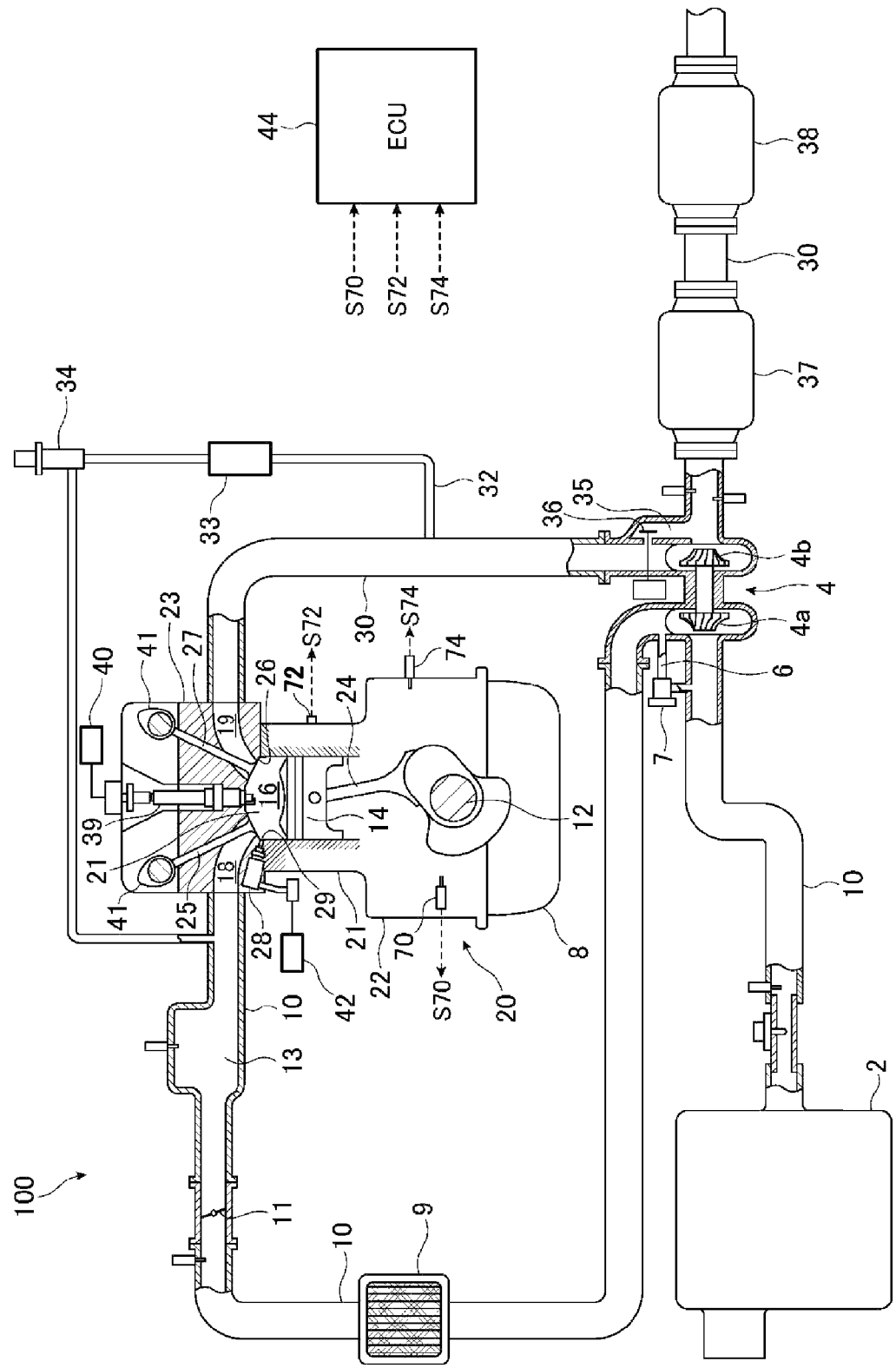
FIG. 1 is a schematic diagram of an engine system to which a control device of an engine is applied according to an embodiment of the present invention.

First, a device configuration of the engine, to which a control device of the engine is applied according to the embodiment of the present invention, will be explained with FIG. 1. FIG. 1 is a schematic diagram of an engine system to which the control device of the engine is applied according to the embodiment of the present invention.

As shown in FIG. 1, an engine system 100 has mainly an intake passage 10 where the intake (air) introduced from the outside that passes through, an engine 20 (a gasoline engine in the present embodiment) that generates vehicle power by combusting the air fuel mixture of the intake supplied from this intake passage 10, and fuel that is supplied from a fuel injection valve (e.g., injector 28) described hereinbelow, an exhaust passage 30 that exhausts the exhaust gas generated by combustion in the engine 20, and an ECU (Electronic Control Unit) 44 that controls the whole engine system 100.

The intake passage 10, in order from the upstream side, is provided an air cleaner 2 for purifying the intake introduced from the outside, a compressor 4a of a turbo supercharger 4 for increasing an intake pressure by compressing the intake passing through, an intercooler 9 for cooling the intake passing through, a throttle valve 11 for adjusting the intake amount passing through, and a surge tank 13 for temporarily storing the intake to supply the engine 20. Moreover, the intake passage 10 is provided an air bypass passage 6 that flows the intake by bypassing the compressor 4a of the turbo supercharger 4. Specifically, one end of the air bypass passage 6 is connected to the intake passage 10 on the downstream side of the compressor 4a and the upstream side of the throttle valve 11, and the other end is connected to the intake passage 10 on the upstream side of the compressor 4a. Moreover, an air bypass valve 7, which controls the intake flowing in the air bypass passage 6, is provided on this air bypass passage 6.

The engine 20 has a cylinder block 22, to which cylinders 21 are provided (further, even though only one cylinder 21 is shown in FIG. 1, for example, four cylinders 21 might be provided in series), a cylinder head 23 that is arranged on this cylinder block 22, and an oil pan 8, which is arranged to the lower side of the cylinder block 22 and in which the lubricant is stored. A piston 14, which is connected to a crank shaft 12 via a connecting rod 24, is inserted to reciprocatively fit in each cylinder 21. The cylinder head 23, the cylinders 21, and the piston 14 demarcate a combustion chamber 16.

While each independent two intake ports 18 and two exhaust ports 19 are formed for each cylinder 21 on the cylinder head 23, an intake valve 25 and an exhaust valve 27, which open and close an opening on the combustion chamber 16 side, are arranged on these intake ports 18 and the exhaust ports 19. The intake ports 18 are connected to the intake passage 10 and the exhaust ports 19 are connected to the exhaust passage 30. The intake ports 18 function as the tumble flow generation means to generate a longitudinal vortex flow (tumble flow) in the combustion chamber 16.

Moreover, a ceiling 26 of the combustion chamber 16 is formed on a lower surface of the cylinder head 23. The ceiling 26 is so-called a pent roof-shaped type that has two opposing inclined surfaces extending from the central part to a lower end of the cylinder head 23.

The cylinder head 23 is also provided the (direct injection) injector 28 for each cylinder 21, which directly injects fuel into the cylinder 21. The injector 28 is arranged so that its nozzle port 29 is facing obliquely downward into the combustion chamber 16 from between two intake ports 18 on the periphery of the ceiling 26 of the combustion chamber 16. This injector 28 directly injects the fuel into the combustion chamber 16 at an injection timing set corresponding to an operating state of the engine 20 and also in the amount corresponding to the operating state of the engine 20. The detailed structure of the injector 28 will be described later.

The cylinder head 23 is also provided an ignition plug 39 for each cylinder 21 for forcibly igniting the air fuel mixture in the combustion chamber 16. The ignition plug 39 is arranged so as to extend downward from a central part of the ceiling 26 of the combustion chamber 16 and penetrate inside of the cylinder head 23. An ignition circuit 40 supplying voltage to the ignition plug 39 is connected to the ignition plug 39.

The cylinder head 23 is also provided a valve drive mechanism 41 driving each intake valve 25 and exhaust valve 27 of each cylinder 21. This valve drive mechanism 41, for example, has a variable valve lift mechanism (VVL) (not shown), which can change lift amounts of the intake valve 25 and the exhaust valve 27, and a variable valve timing mechanism (VVT) (not shown), which can change a rotation phase of a cam shaft for the crank shaft 12.

The injector 28 is connected to a fuel tank (not shown) by a fuel supply passage (not shown). A fuel supply system 42, which can supply fuel to the injector 28 at a desired fuel pressure, is inserted on this fuel supply passage. The pressure of fuel being supplied to the injector 28 is changed corresponding to the operating state of the engine 20.

On the exhaust passage 30, in order from the upstream side, a turbine 4b of the turbo supercharger 4, which is rotated by the exhaust gas passing though and drives the compressor 4a by this rotation as mentioned above, and exhaust purification catalysts 37 and 38, which have a clarification function of the exhaust gas, for example, a $NO_x$ catalyst, a three-way catalyst, or an oxidation catalyst and the like, are provided. Moreover, an EGR (Exhaust Gas Recirculation) passage 32 for refluxing the exhaust gas to intake passage 10 is connected to the exhaust passage 30. One end of this EGR passage 32 is connected to the exhaust passage 30 on the upstream side of the turbine 4b and the other end is connected to the intake passage 10 on the downstream side of the throttle valve 11. Additionally, the EGR passage 32 is provided an EGR cooler 33 for cooling the exhaust gas being refluxed and an EGR valve 34 for controlling the exhaust gas flowing in the EGR passage 32. Moreover, the exhaust passage 30 is provided a turbine bypass passage 35 for flowing the exhaust gas by bypassing the turbine 4b of the turbo supercharger 4. On this turbine bypass passage 35, a wastegate valve (W/G Valve) 36 for controlling the exhaust gas flowing in the turbine bypass passage 35 is provided.

ECU 44 is comprises a microprocessor including a CPU, a memory, a counter timer group, an interface, and paths for connecting these units. This ECU 44 forms a controller.

Moreover, the engine 20 has a crank angle sensor 70 for detecting a rotation angle of the crank shaft 12, a water temperature sensor 72 for detecting a temperature of an engine coolant, a vibration sensor 74 for detecting vibrations of the engine 20, and an accelerator opening sensor (not shown) for detecting an accelerator opening degree corresponding to an operation amount of an accelerator pedal of a vehicle. These detection signals of each kind of sensor are input to the ECU 44. The ECU 44 determines the state of the engine 20 or the vehicle by various calculations based on these detection signals, and outputs control signals to the injector 28, the ignition circuit 40, the valve drive mechanism 41, the fuel supply system 42, and the like corresponding to this determination. In this way, the ECU 44 operates the engine 20. As will be described later, the ECU 44 is equivalent to the control device of the engine 20 according to the present invention, and functions as a fuel injection valve control means and a pre-ignition detection means.

Detailed Structures of the Piston, the Injector, and the Ignition Plug

Figure 2:
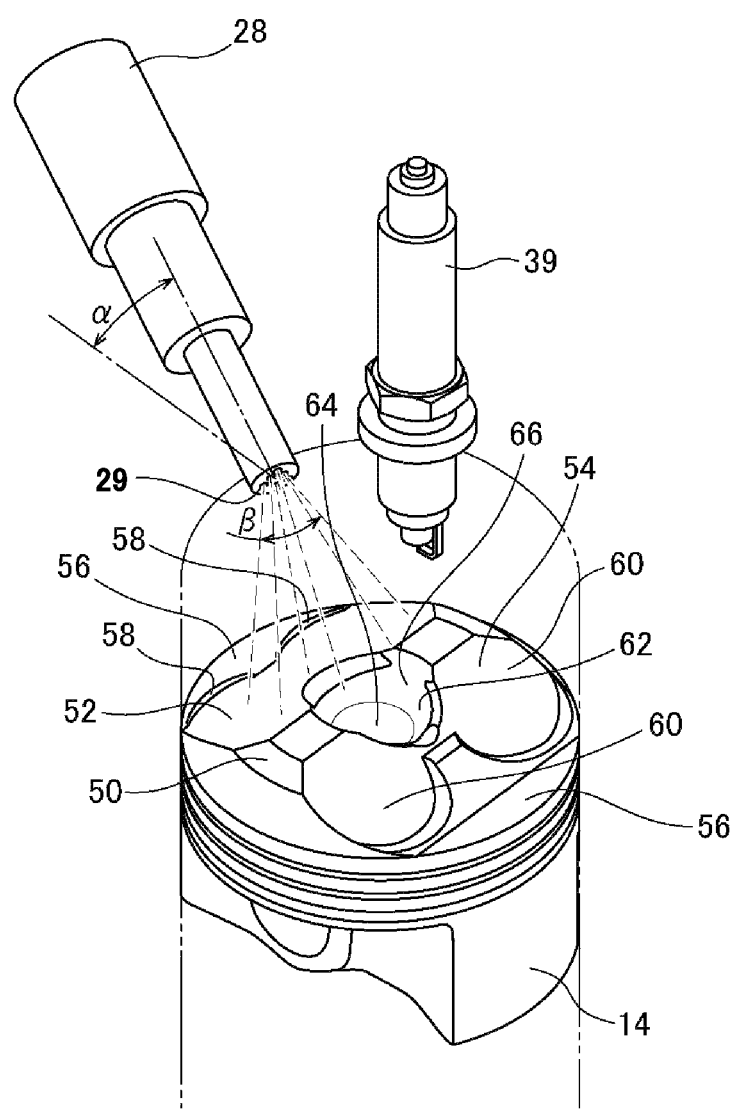
FIG. 2 is a perspective view showing detailed structures of an injector and an ignition plug of the engine according to the embodiment of the present invention.

Next, with reference to FIGS. 2, 3A, and 3B, the detailed structures of the engine 20, the piston 14, the injector 28, and the ignition plug 39 according to the embodiment of the present invention will be described. FIG. 2 is a perspective view showing the detailed structures of the injector 28 and the ignition plug 39 of the engine 20 according to the embodiment of the present invention. Moreover, FIGS. 3A and 3B are figures showing the piston 14 of the engine 20 according to the embodiment of the present invention, where FIG. 3A is a top plan view of the piston 14 and FIG. 3B is a view taken along a line A-A of FIG. 3A.

As shown in FIG. 2, the injector 28 is a multi-nozzle port type injector having a plurality of nozzle ports 29. This injector 28 is provided so that the axial direction of the injector 28 inclines downward by only the angle of inclination $\alpha$ from the horizontal direction. According to this, fuel spray that is injected from each nozzle port 29 of the injector 28 extends radially at the predetermined spread angle $\beta$ obliquely downward from the periphery of the ceiling 26 of the combustion chamber 16.

Figure 3A:
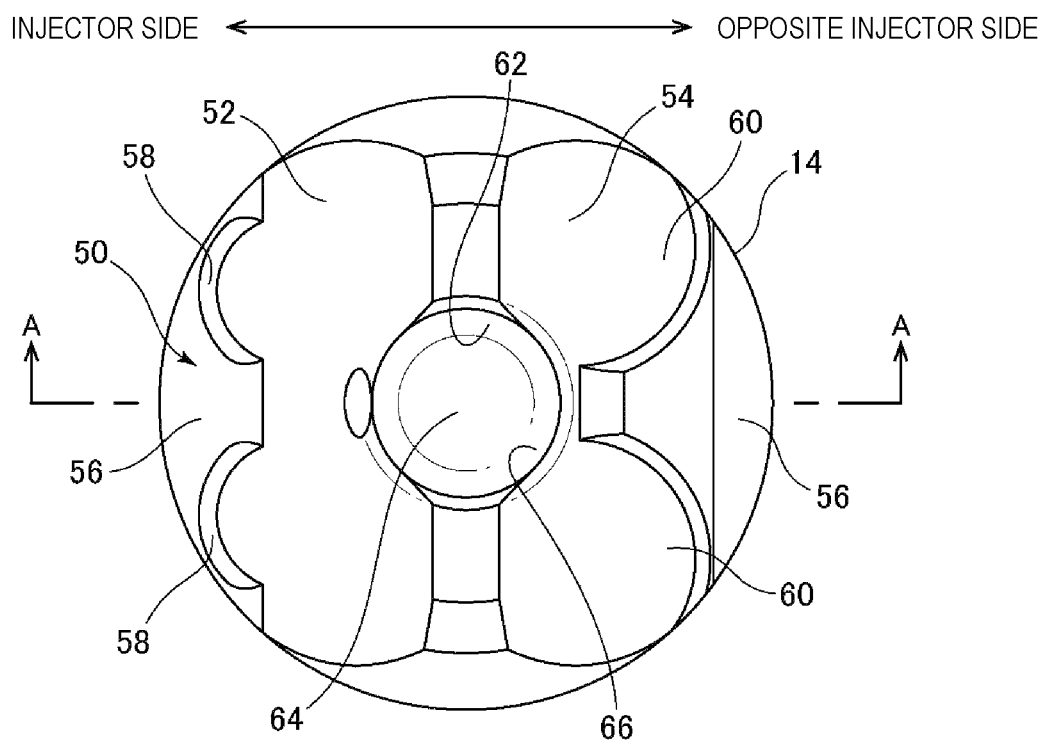
FIGS. 3A and 3B are figures showing a piston of the engine according to the embodiment of the present invention, where
Figure 3B:
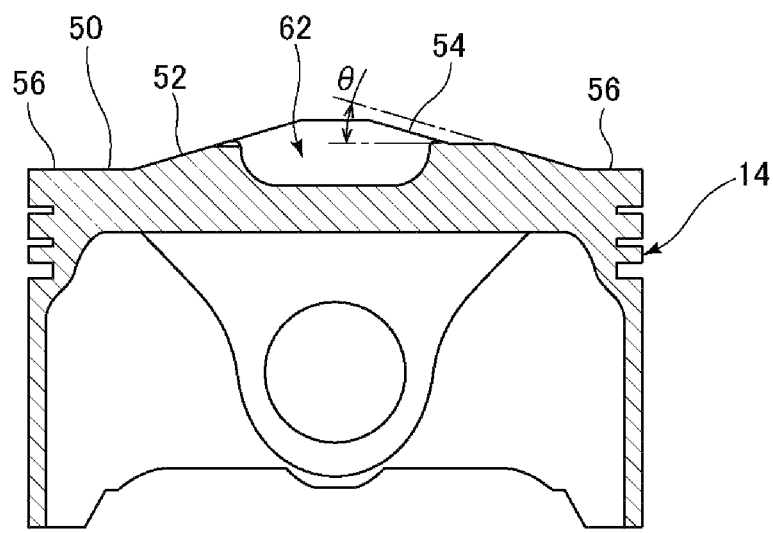

As shown in FIG. 2 and FIGS. 3A and 3B, a piston crown surface 50 forming a top part of the piston 14 is formed convex so as to rise toward its center. Specifically, the piston crown surface 50 has an injector side slope 52, which extends from the end of the injector 28 side of the piston crown surface 50 obliquely upward toward the center of the piston crown surface 50, and an opposite injector side slope 54, which extends from the end of the side apart from the injector 28 of the piston crown surface 50 (hereinafter, "opposite injector side" as needed) obliquely upward toward the center of the piston crown surface 50 at the angle of inclination $\theta$. The injector side slope 52 and opposite injector side slope 54 are formed along the ceiling 26 of the combustion chamber 16.

Moreover, horizontal surfaces 56, which become a reference surface of the piston crown surface 50, are formed on the end of the injector 28 side and the end of the opposite injector 28 side of the piston crown surface 50. Additionally, an intake valve recess 58, which is recessed to avoid contact between the piston 14 and the intake valve 25, is formed on the end of the injector 28 side of the piston crown surface 50, and an exhaust valve recess 60, which is recessed to avoid contact between the piston 14 and the exhaust valve 27, is formed on the opposite injector side slope 54.

Further, a cavity 62, which is recessed in a substantially round shape in planar view, is formed on the center of the piston crown surface 50. This cavity 62 is formed by a horizontal bottom surface 64 that is a substantially round shape in planar view and a side surface 66 that extends diagonally so as to expand upward from the circumference of the bottom surface 64. When the piston 14 is positioned at a top dead center, a pointed end of the ignition plug 39 is arranged facing into the cavity 62, so that a substantially spherical combustion space centering the pointed end of the ignition plug 39 is configured.

Distinction Between Pre-Ignition and Knocking

Figure 4:
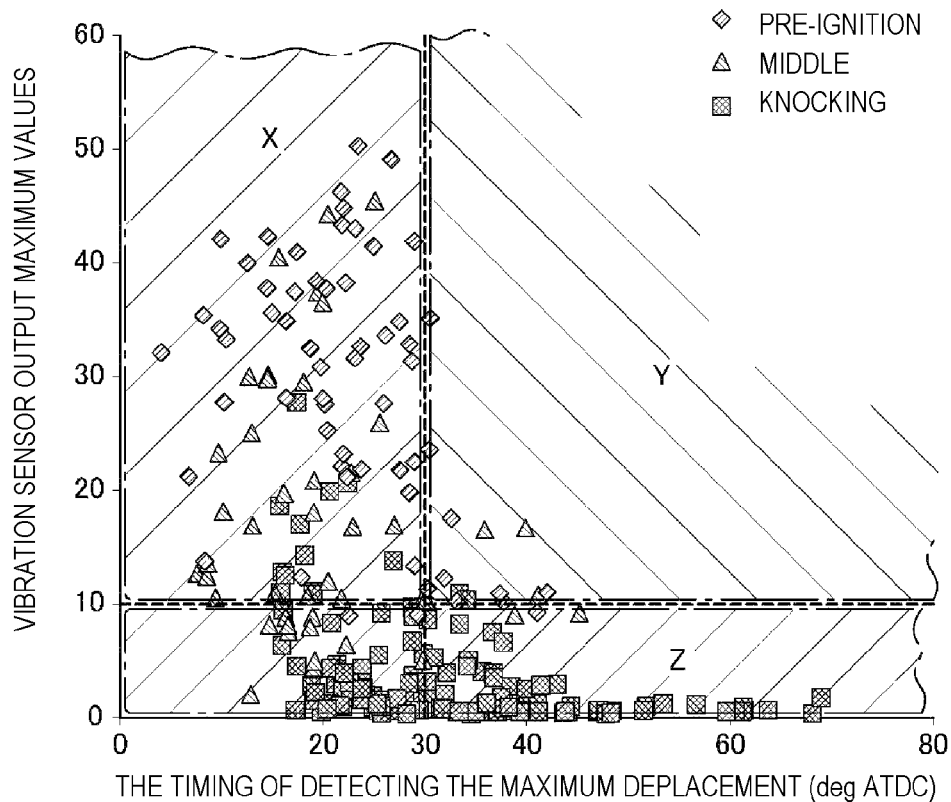
FIG. 4 is a scatter diagram that plots vibration levels and vibration detection timings of the engine vibrations generated by pre-ignition and knocking.
Figure 5:
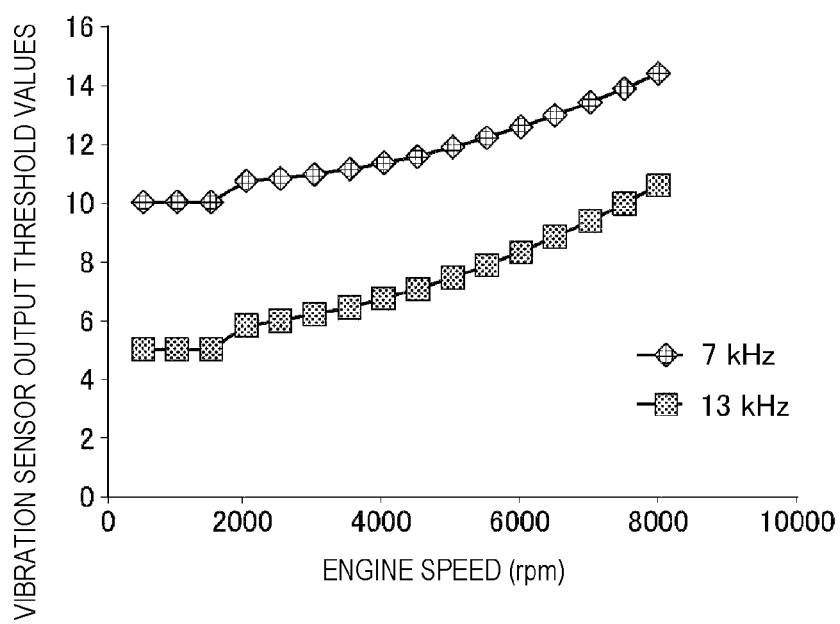
FIG. 5 is a diagram showing threshold values to use when the control device of the engine according to the embodiment of the present invention determines the occurrence of pre-ignition.

Next, with reference to FIGS. 4 and 5, the distinction between pre-ignition and knocking will be described. FIG. 4 is a scatter diagram that plots vibration levels and vibration detection timings of the vibrations of the engine 20 that are generated by pre-ignition and knocking, and FIG. 5 is a diagram showing threshold values to use when the control device of the engine 20 according to the embodiment of the present invention determines the occurrence of pre-ignition.

The inventors of the present invention operate an engine under an operation condition in which pre-ignition and knocking easily occur by using an experimental engine having a cylinder inner pressure sensor of each cylinder 21 and identifying the occurrence of pre-ignition and knocking from changes in the cylinder inner pressure, and also measuring a maximum displacement of each vibration of frequencies 7 kHz and 13 kHz, which are detected by the vibration sensor 74 when pre-ignition and knocking occur and a timing at which the maximum displacement is detected. As one example, a measurement result of the predetermined engine speed shows in FIG. 4. Moreover, the frequencies 7 kHz and 13 kHz of vibrations are selected as a frequency that can obtain a favorable S/N (signal-to-noise) ratio for detecting vibrations caused by pre-ignition and knocking. In FIG. 4, the vertical axis shows output values (dimensionless) when the vibration sensor 74 detects the maximum displacement of the vibrations of each frequency, and the horizontal axis shows crank angles after the compression top dead center (degrees after top dead center, hereinafter "deg ATDC") when the vibration sensor 74 detects the maximum displacement. Moreover, in FIG. 4, the maximum displacement in the case of clearly identifying pre-ignition from changes of each cylinder inner pressure is indicated by diamonds, the maximum displacement in the case of clearly identifying knocking from changes of each cylinder inner pressure is indicated by squares, and the maximum displacement in the case of being in the middle between pre-ignition and knocking is indicated by triangles.

In FIG. 4, as shown with diamonds, the vibrations detected by the vibration sensor 74 when pre-ignition occurs are in the area (X area in FIG. 4) where the maximum displacement is equal to 10 or more and also the detection timing is less than 30 (deg ATDC). Correspondingly, the vibrations detected by the vibration sensor 74 when knocking occurs are in the area where the maximum displacement is less than 10 (Z area in FIG. 4). Moreover, the area (Y area in FIG. 4) where the maximum displacement is equal to 10 or more and also the detection timing is equal to 30 or more (deg ATDC) shows almost no pre-ignition and knocking occurred. That is, in the example of FIG. 4, when the maximum displacement of vibrations detected by the vibration sensor 74 is equal to 10 or more and also the detection timing is less than 30 (deg ATDC), it is possible to determine that those vibrations are not generated due to knocking but to pre-ignition.

Thus, the inventors of the present invention performed measurements as mentioned above for various engine speeds and determined the threshold value for each frequency of vibrations to determine the occurrence of pre-ignition based on the vibrations detected by the vibration sensor 74 at each engine speed. The threshold values (first threshold value) of the vibration displacements to determine the occurrence of pre-ignition are shown in FIG. 5. In FIG. 5, the horizontal axis shows the engine speeds (rpm), and the vertical axis shows the threshold values of the maximum displacement of vibrations to determine the occurrence of pre-ignition.

As shown in FIG. 5, in any case of vibration frequencies 7 kHz and 13 kHz, the higher the engine speed becomes, the higher the threshold value of the vibration displacement to determine the occurrence of pre-ignition is set. This reflects that the more the engine speed is increased and the time required for the intake stroke or the expansion stroke is shortened, the stronger the shock wave generated when pre-ignition or knocking occurs, and thus the vibration displacement becomes larger.

Moreover, as shown in FIG. 5, the threshold value of the maximum displacement of vibrations to determine the occurrence of pre-ignition is smaller when the frequency of vibration is 7 kHz than when it is 13 kHz. Thus, as the frequency of vibration of the engine 20 becomes high, the threshold value of the maximum displacement of vibrations to determine the occurrence of pre-ignition is set low. This reflects that the higher the frequency becomes, the smaller the displacement of mechanical vibrations becomes.

Moreover, the reference timing of the detection timing of vibrations to determine the occurrence of pre-ignition is set to be the timing retarded by about 20 (deg) from the ignition timing of each cylinder 21. This reference timing is constant, independent of the vibration frequency or the engine speed.

Fuel Injection Timing

Figure 6:
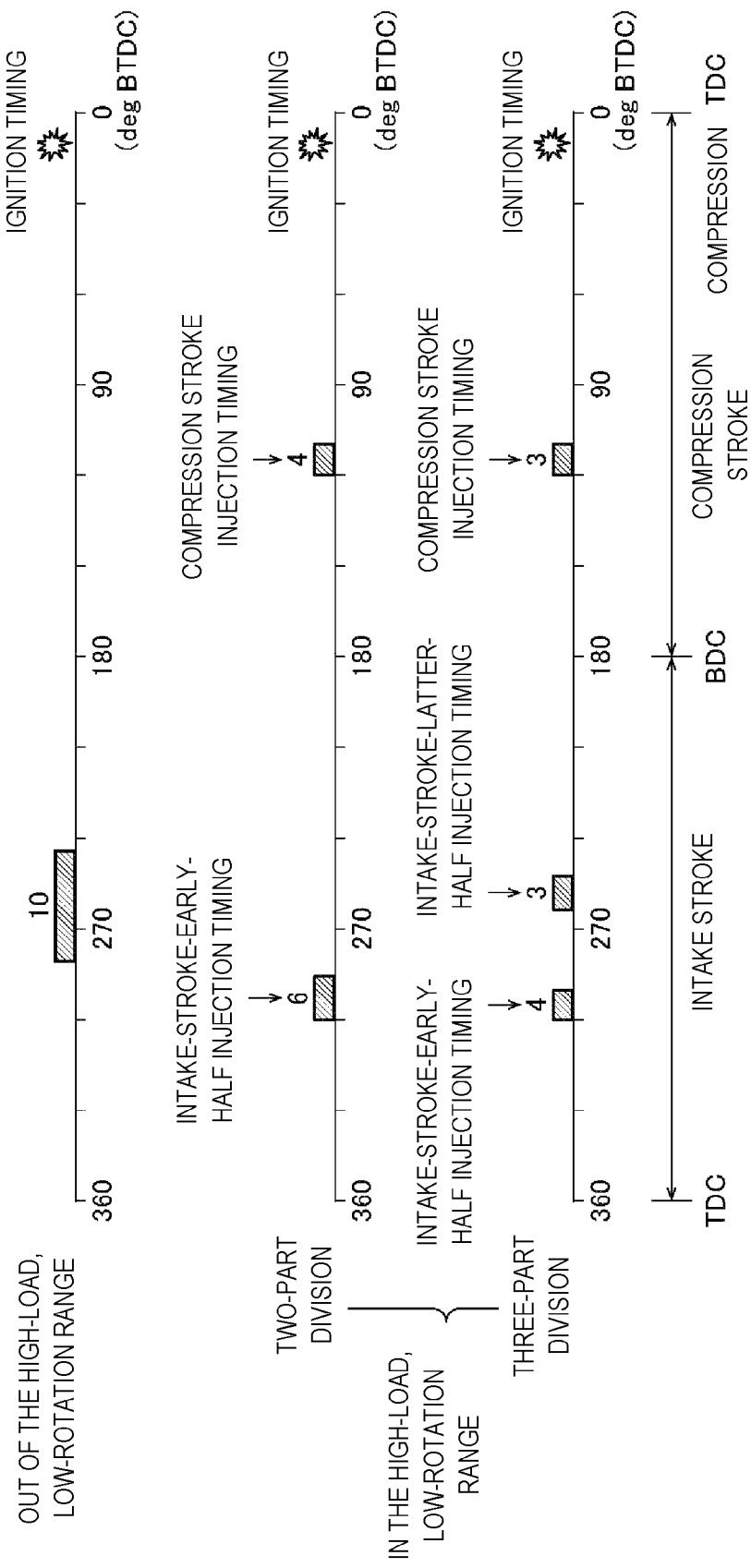
FIG. 6 is a timing diagram showing fuel injection timings by the control device of the engine according to a first embodiment of the present invention.

Next, with reference to FIG. 6, the control at the fuel injection timing by the control device of the engine 20 according to the embodiment of the present invention will be described. FIG. 6 is a timing diagram showing fuel injection timings by the control device of the engine 20 according to the embodiment of the present invention and the horizontal axis in FIG. 6 shows crank angles before the compression top dead center (degrees before top dead center, hereinafter "deg BTDC"). Moreover, numbers on the bar showing fuel injection timings show the fuel injection amount at each fuel injection timing when a total fuel injection amount in one cycle is 10.

As shown in FIG. 6, when the operating state of the engine 20 is in the high-load, low-rotation range, the cylinder inner pressure or the cylinder temperature is high, and the operating state is in the state in which pre-ignition easily occurs, for the purpose of suppressing pre-ignition, the fuel injection in one cycle is performed in two or three divided parts. Specifically, when the fuel injection is divided into two parts, the fuel is injected by the injector 28 into the two divided timings, which are the early half of the intake stroke of the cylinder 21, more specifically, an intake-stroke-early-half injection timing is set in the vicinity of 300 (deg BTDC), and during the compression stroke of the cylinder 21, more specifically, a compression stroke injection timing is set in the vicinity of 120 (deg BTDC). Especially, the intake-stroke-early-half injection timing is the timing at which fuel is injected from the injector 28 toward the vortex center of tumble flow in the cylinder 21 More specifically, it is set to the timing at which the area, which is an expanded injection area of fuel injected at a predetermined spread angle β by the injector 28, is located further upward than the plane surface including the opposite injector side slope 54 of the piston crown surface 50 on the central axis line of the combustion chamber 16. The ratio of the fuel injection amount at each injection timing, when the total fuel injection amount in one cycle is 10, is the intake-stroke-early-half injection timing: the compression stroke injection timing=6:4. Moreover, when fuel injection is divided into three parts, the fuel is injected by the injector 28 in the three divided injection timings, which are the early half of the intake stroke of the cylinder 21, more specifically, the intake-stroke-early-half injection timing that is set in the vicinity of 300 (deg BTDC), the latter half of the intake stroke of the cylinder 21, more specifically, the intake-stroke-latter-half injection timing that is set in the vicinity of 260 (deg BTDC), and during the compression stroke of the cylinder 21, more specifically, the compression stroke injection timing that is set in the vicinity of 120 (deg BTDC). The ratio of the fuel injection amount at each injection timing, when the total fuel injection amount in one cycle is 10, the intake-stroke-early-half injection timing:the intake-stroke-latter-half injection timing:the compression stroke injection timing=4:3:3. Moreover, for example, the total fuel injection amount in one cycle is set to the lean state in which the air fuel mixture is thinner than the theoretical air fuel ratio as a whole; however, it may not necessarily be the lean state.

Moreover, when the operating state of the engine 20 is relatively out of the high-load, low-rotation range and also in the operating state in which pre-ignition does not easily occur, the ECU 44 injects the fuel in a batch from the injector 28 during the intake stroke of the cylinder 21, more specifically, at the intake stroke injection timing that is set in the vicinity of 280 (deg BTDC). That is, when the operating state of the engine 20 is in the operating state in which pre-ignition does not easily occur, by injecting fuel in a batch at the intake stroke injection timing and evenly distributing the fuel in the combustion chamber 16 while accelerating vaporization of the fuel, the emission performance is improved.

Suppression-Detection-Avoidance Control of Pre-Ignition

Figure 7:
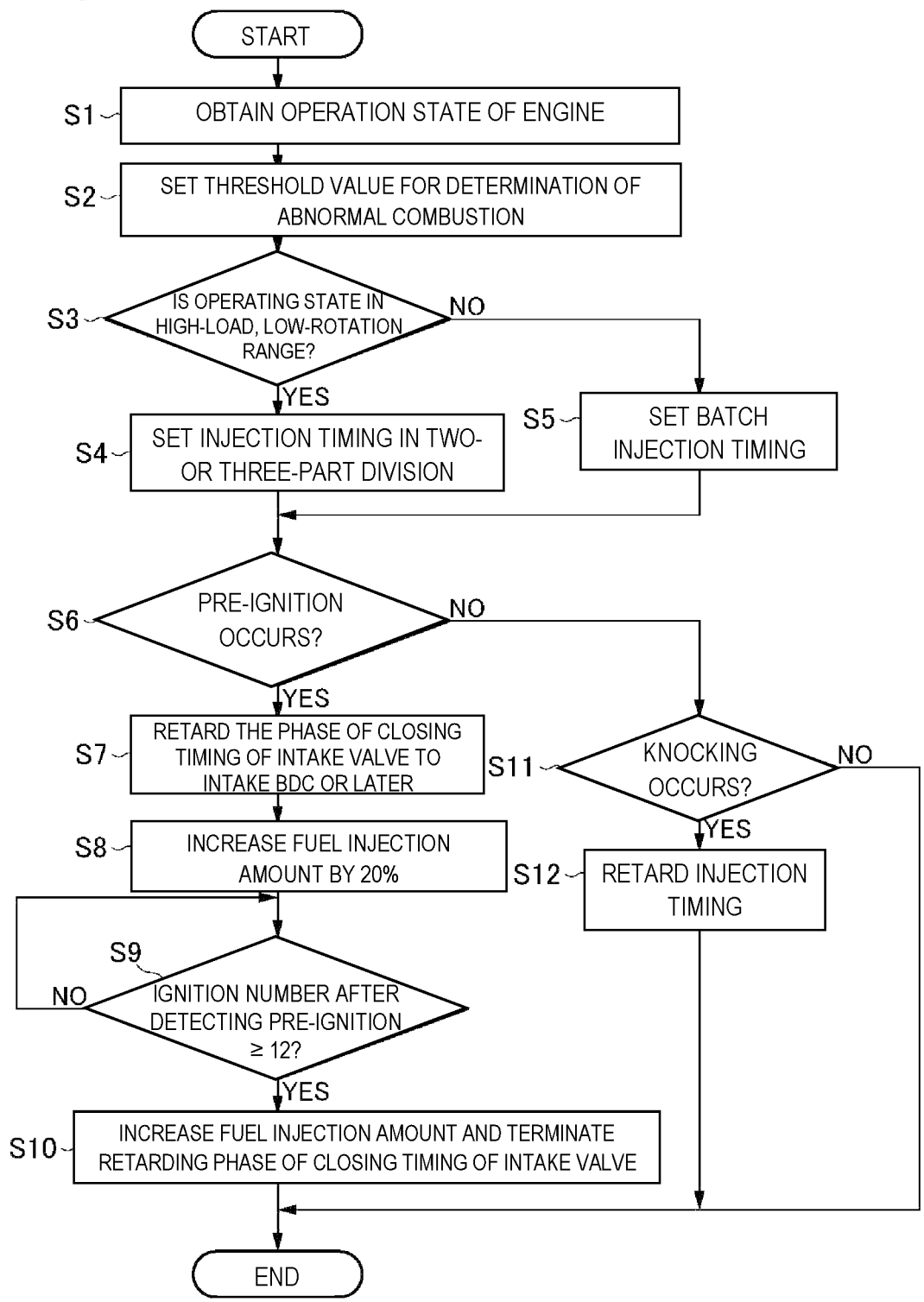
FIG. 7 is a flow chart of a control performed by the control device of the engine according to the first embodiment of the present invention.
Figure 8:
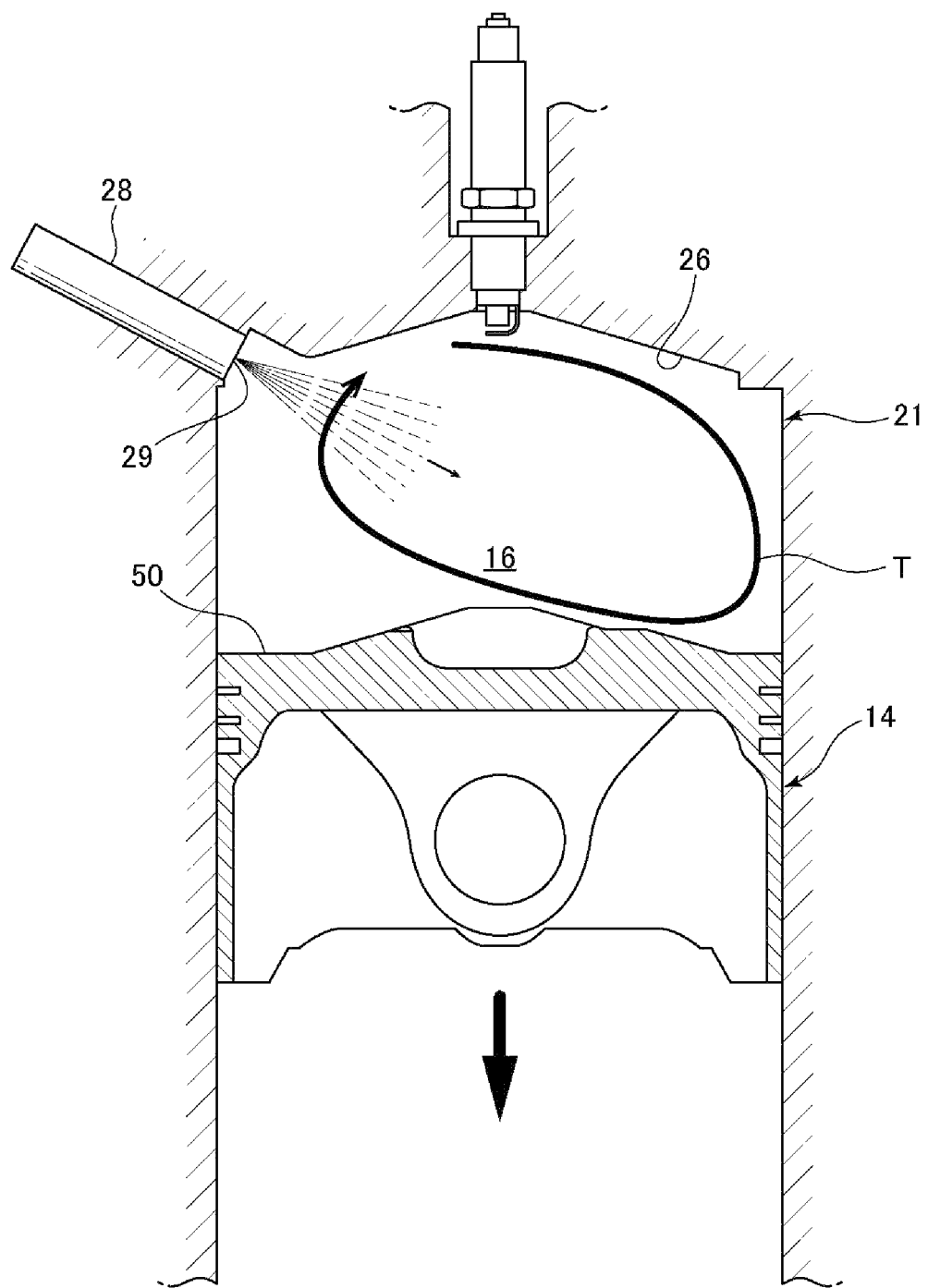
FIG. 8 is a sectional view showing the state in a combustion chamber when fuel is injected at an early half of an intake stroke by the control device according to the embodiment of the present invention.
Figure 9:
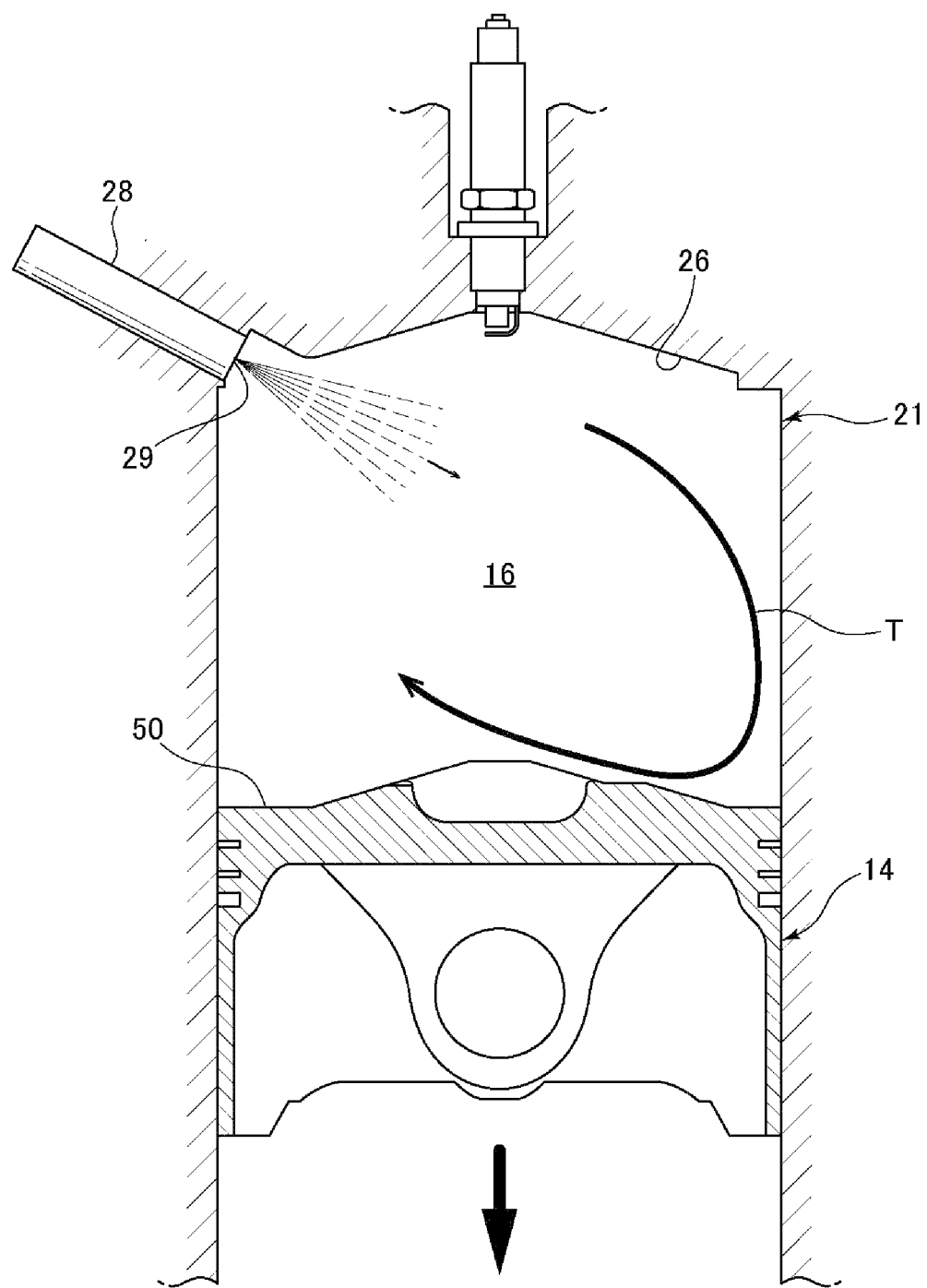
FIG. 9 is a sectional view showing the state in the combustion chamber when fuel is injected at a latter half of the intake stroke by the control device according to the embodiment of the present invention.
Figure 10:
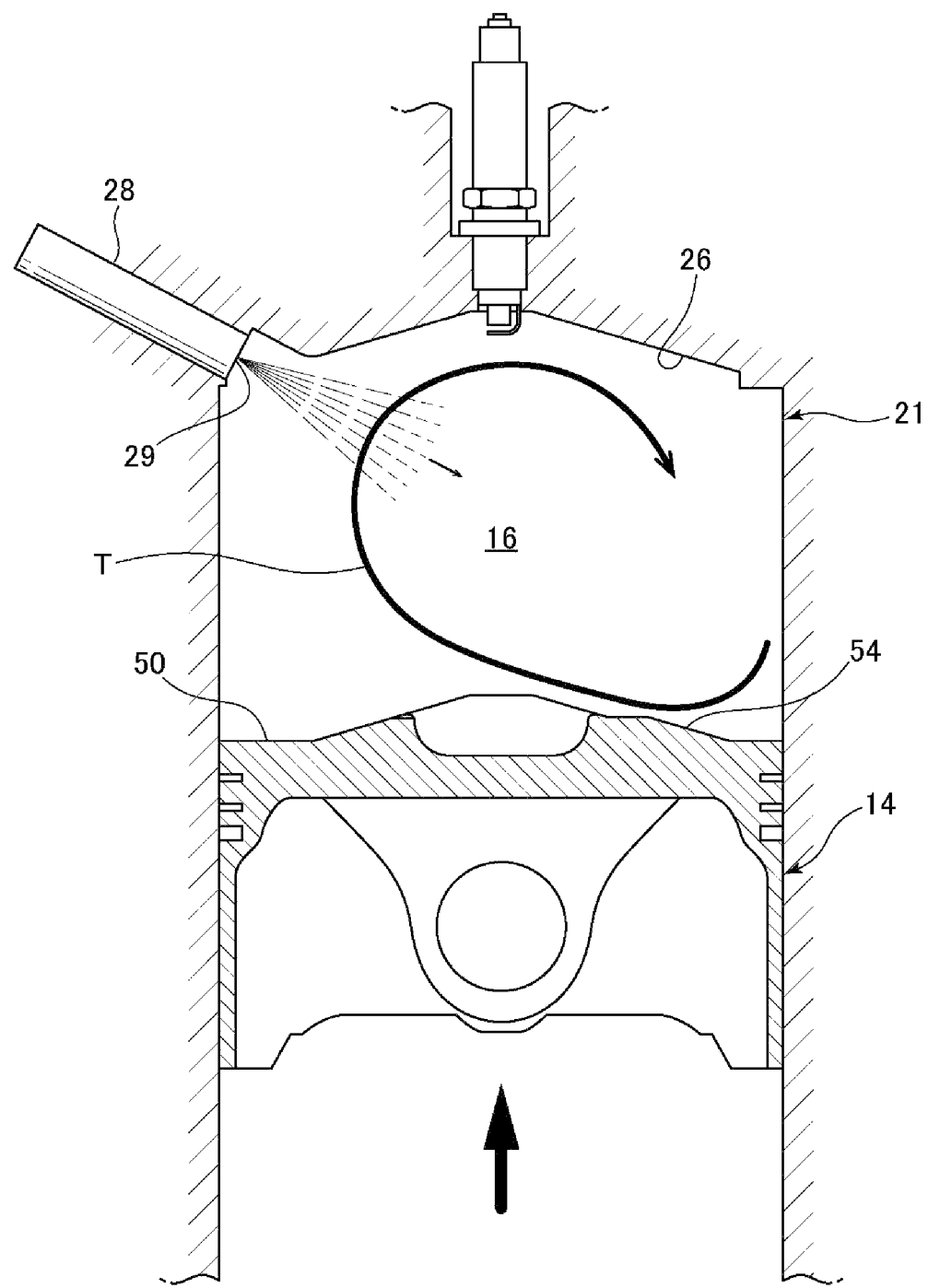
FIG. 10 is a sectional view showing the state in the combustion chamber when fuel is injected at a compression stroke by the control device according to the embodiment of the present invention.

Next, with reference to FIGS. 7 to 11, the suppression-detection-avoidance control of pre-ignition performed by the control device of the engine 20 according to a first embodiment of the present invention will be described. FIG. 7 is a flow chart of suppression-detection-avoidance control performed by the control device of the engine 20 according to the first embodiment of the present invention. The processes shown in FIG. 7 are repeatedly performed by the ECU 44 at a predetermined cycle when driving the vehicle. Moreover, FIGS. 8 to 10 are sectional views showing the state in the surge tank when the operating state of the engine 20 according to the embodiment of the present invention is in the high-load, low-rotation range, FIG. 8 shows the state in the surge tank when fuel is injected at the early half of the intake stroke, FIG. 9 shows the state in the surge tank when fuel is injected at the latter half of the intake stroke, and FIG. 10 shows the state in the surge tank after fuel is injected at the compression stroke, respectively.

Figure 11:
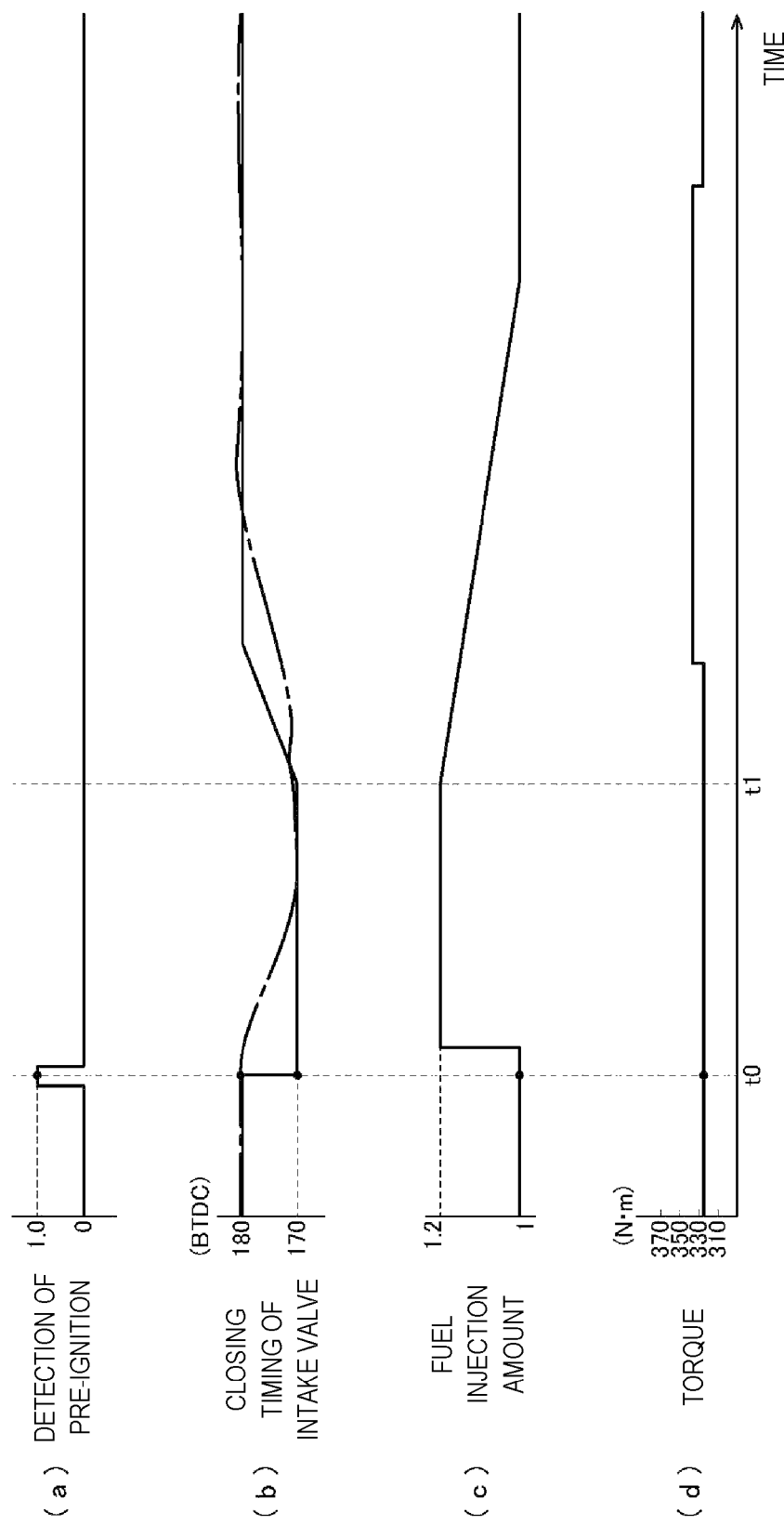
FIG. 11 a timing diagram showing control timings of fuel injection amounts and the closing timing of the intake valve by the control device according to the embodiment of the present invention.

Moreover, FIG. 11 is a timing diagram showing control timings of fuel injection amounts and the closing timing of the intake valve by the control device according to the embodiment of the present invention, (a) shows the detection value ("1" means detection) of pre-ignition, (b) shows the closing timing (deg BTDC) of the intake valve 25, (c) shows the adjustment coefficient of the fuel injection amount, and (d) shows generated torque (Nm) of the engine 20, respectively.

As shown in FIG. 7, once the suppression-detection-avoidance control of pre-ignition starts, at first, in Step S1, the ECU 44 obtains the operating state of the engine 20 based on the detection signals input from various sensors. For example, the ECU 44 obtains the operating state of the engine 20 based on the accelerator opening degree input from the accelerator opening degree sensor or the crank angle input from the crank angle sensor 70.

Next, in Step S2, the ECU 44 sets the threshold value (a first threshold value) of the vibration displacement to determine the occurrence of pre-ignition based on the obtained operating state of the engine 20 in Step S1.

Specifically, the ECU 44 refers to a map as exemplified in FIG. 5 and sets the first threshold value corresponding to the obtained engine speed in Step S1.

Moreover, the ECU 44 sets a threshold value (a second threshold value) of the vibration displacement to determine the occurrence of knocking. The second threshold value is set smaller than the first threshold value.

Next, in Step S3, the ECU 44 determines whether or not the obtained operating state of the engine 20 in Step S1 is in the high-load, low-rotation range out of the entire operating range. As a result of that, when the operating state of the engine 20 is in the high-load, low-rotation range, proceeding to Step S4, the ECU 44 sets a plurality of fuel injection timings including the intake-stroke-early-half injection timing set at the early half of the intake stroke of the cylinder 21.

For example, when determining that a necessary injection interval for the operation of the injector 28 can be secured, even though dividing the fuel injection in one cycle into three parts based on the engine speed or the temperature of the engine coolant that was obtained in Step S1, as shown in FIG. 6, the ECU 44 sets three timings as the fuel injection timing, which are the early half of the intake stroke of the cylinder 21, more specifically, the intake-stroke-early-half injection timing that is set in the vicinity of 300 (deg BTDC), and the latter half of the intake stroke, more specifically, the intake-stroke-latter-half injection timing that is set in the vicinity of 260 (deg BTDC), and during the compression stroke of the cylinder 21, more specifically, the compression stroke injection timing that is set in the vicinity of 120 (deg BTDC). On the other hand, based on the engine speed or the temperature of the engine coolant that was obtained in Step S1, when determining that the necessary injection interval for the operation of the injector 28 cannot be secured, if dividing the fuel injection in one cycle into three parts, as shown in FIG. 6, the ECU 44 sets two timings as the fuel injection timing, which are the early half of the intake stroke of the cylinder 21, more specifically, the intake-stroke-early-half injection timing that is set in the vicinity of 300 (deg BTDC), and during the compression stroke of the cylinder 21, more specifically, the compression stroke injection timing that is set in the vicinity of 120 (deg BTDC).

Hereinafter, with reference to FIGS. 8 to 10, the state in the combustion chamber when the control device of the engine 20 according to the embodiment of the present invention controls the fuel injection timing will be described. FIGS. 8 to 10 are sectional views showing the state in the surge tank when the operating state of the engine 20 according to the embodiment of the present invention is in the high-load, low-rotation range, FIG. 8 shows the state in the surge tank when fuel is injected at the intake-stroke-early-half injection timing, FIG. 9 shows the state in the surge tank when fuel is injected at the intake-stroke-latter-half injection timing, and FIG. 10 shows the state in the surge tank when fuel is injected at the compression stroke injection timing, respectively.

First, at the intake-stroke-early-half injection timing, as shown in FIG. 8, a tumble flow T (longitudinal vortex flow) generates by the intake that flows into the combustion chamber 16 from the intake port 18 corresponding to an opening valve of the intake valve 25 and a descent of the piston 14. The ECU 44 controls the injector 28 and the fuel supply system 42, injects the fuel from injector 28 at the intake-stroke-early-half injection timing, then the fuel that was injected from the injector 28 is injected toward the vortex center of the tumble flow T further upward than the lower part of the tumble flow T, which flows obliquely upward toward the injector 28 side along the opposite injector side slope 54 of the piston crown surface 50. In this case, since the penetration force in the injection direction of the injected fuel is reduced by the kinetic energy of the tumble flow T flowing in a direction orthogonal to the fuel injection direction, the fuel does not completely penetrate the tumble flow T and the fuel adhesion to a wall surface of the combustion chamber 16 is reduced.

Next, at the intake-stroke-latter-half injection timing, as shown in FIG. 9, the tumble flow T that generated at the early half of the intake stroke expands in the vertical direction with the descent of the piston 14. At this timing, the ECU 44 controls the injector 28 and the fuel supply system 42 and injects the fuel from the injector 28, so that fuel is injected toward the vicinity of an upper end of the tumble flow T. At this vicinity of the upper end of the tumble flow T, the tumble flow T flows in a direction from the intake port 18 toward the exhaust port 19, that is, in a direction away from the injector 28. Accordingly, fuel injected from the injector 28 is injected in the same direction as the flow direction in the vicinity of the upper end of the tumble flow T and flows with the tumble flow T in a spiral manner in the combustion chamber 16, so that the fuel adhesion to the wall surface is reduced.

Moreover, at the compression stroke injection timing, as shown in FIG. 10, the tumble flow T generated in the intake stroke flows in a spiral manner between the ceiling 26 of the combustion chamber 16 and the piston crown surface 50 while being compressed in the vertical direction with the rise of the piston 14. Therefore, the ECU 44 controls the injector 28 and the fuel supply system 42, and injects the fuel from injector 28 at the compression stroke injection timing. The fuel is injected from the injector 28 toward the vortex center of the tumble flow T further upward than the lower part of the tumble flow T, which flows obliquely upward toward the injector 28 side along the opposite injector side slope 54 of the piston crown surface 50. In this case, since the penetration force in the injection direction of the injected fuel is reduced by the kinetic energy of the tumble flow T flowing in a direction orthogonal to the fuel injection direction, the fuel does not completely penetrate the tumble flow T and the fuel adhesion to the wall surface of the combustion chamber 16 is reduced.

As described above, when fuel injection is divided into three parts, while the ECU 44 divides the fuel injection timing into the three timings of the intake-stroke-early-half injection timing, the intake-stroke-latter-half injection timing, and the compression stroke injection timing, it injects the fuel from the injector 28 so that the ratio of the fuel injection amount at each injection timing becomes the intake-stroke-early-half injection timing:intake-stroke-latter-half injection timing:the compression stroke injection timing=4:3:3. Thus, by dividing the fuel injection timing into the three timings of the intake-stroke-early-half injection timing, the intake-stroke-latter-half injection timing, and the compression stroke injection timing, compared to a batch injection, the fuel injection amount of each injection timing is suppressed, the penetration force in the fuel injection direction is reduced, and the fuel adhesion to the piston crown surface 50 or the wall surface of the combustion chamber 16 is reduced. Moreover, by dividing the fuel injection timing into the three timings mentioned above, fuel can be injected at the timing that reduces the fuel adhesion to the piston crown surface 50 or the wall surface of the combustion chamber 16. Especially, regarding the fuel injection at the intake-stroke-early-half injection timing, by injecting fuel toward the vortex center of the tumble flow T, the penetration force in the injection direction of the injected fuel is reduced by the kinetic energy of the tumble flow T and the fuel adhesion to the wall surface of the combustion chamber 16 is reduced effectively. Moreover, by performing the fuel injection at the compression stroke, the inside of the combustion chamber 16 is cooled by the latent heat of vaporization of the fuel and it becomes the state in which pre-ignition does not easily occur.

Moreover, also when the fuel injection is divided into the two parts of the intake-stroke-early-half injection timing and the compression stroke injection timing, as with the fuel injection divided into three parts, while the fuel adhesion to the piston crown surface 50 or the wall surface of the combustion chamber 16 is reduced, the inside of the combustion chamber 16 becomes the state in which pre-ignition does not easily occur by the fuel injection at the compression stroke injection timing.

Returning to the flow chart in FIG. 7, in Step S3, when the operating state of the engine 20 is out of the high-load, low-rotation range, proceeding to Step S5, as shown in FIG. 6, the ECU 44 sets the timing during the intake stroke of the cylinder 21, more specifically, the intake stroke injection timing that is set in the vicinity of 280 (deg BTDC), as the fuel injection timing to inject the fuel in a batch from the injector 28.

After Step S4 or S5, proceeding to Step S6, the ECU 44 determines whether pre-ignition occurred or not based on the detection signals input from the vibration sensor 74 and the threshold value set in Step S2. Specifically, the ECU 44 determines that pre-ignition occurred when the vibration displacement of the engine 20 at the frequency 7 kHz or 13 kHz is greater than or equal to the first threshold value (the value of the detection signals is greater than or equal to 100 in the present embodiment) and also when the timing at which the vibration displacement became greater than or equal to the first threshold value is earlier than the predetermined reference timing (the timing retarded by about 20 (deg) from the ignition timing of the cylinder 21 in the present embodiment).

As a result, when it is determined that pre-ignition has occurred, proceeding to Step S7, the ECU 44 retards the phase of closing timing of the intake valve 25 to the intake bottom dead center or later by the valve drive mechanism 41.

Next, in Step S8, the ECU 44 increases the fuel injection amount of the injector 28 at each fuel injection timing by 20%.

Next, in Step S9, the ECU 44 maintains the phase of the closing timing of the intake valve 25 that was retarded in Step S7 and the fuel injection amount that was increased in Step S8 until the number of ignitions after detecting the occurrence of pre-ignition in Step S6 becomes 12.

Then, when the number of ignitions after detecting the occurrence of pre-ignition in Step S6 reaches 12, proceeding to Step S10, the ECU 44 reverts the phase of the closing timing of the intake valve 25 that was retarded in Step S7 and the fuel injection amount that was increased in Step S8. Then, the ECU 44 terminates the process.

Specifically, as shown in FIG. 11, when detecting the occurrence of pre-ignition in Step S6 (Time t0 in FIG. 11), the ECU 44, in Step S7, outputs an instruction to the valve drive mechanism 41 (a solid line of FIG. 11 at (b)) in order to retard the phase of the closing timing of the intake valve 25 to the intake bottom dead center or later (170 (deg BTDC) in FIG. 11). The valve drive mechanism 41 drives the VVT of the intake valve 25 corresponding to the instruction of the ECU 44 and retards the phase of the closing timing of the intake valve 25 to the intake bottom dead center or later (a dashed line of FIG. 11 at (b)). Therefore, an effective compression ratio is reduced, the temperature in the combustion chamber 16 at the time of compression is reduced, so that the occurrence of pre-ignition is suppressed.

Moreover, the ECU 44, in Step S8, increases the fuel injection amount of the injector 28 at each fuel injection timing by 20% (FIG. 11 at (c)) and suppresses the occurrence of pre-ignition by cooling inside of the combustion chamber 16 by the latent heat of vaporization of fuel.

Further, although the effective compression ratio is reduced by retarding the phase of the closing timing of the intake valve 25 to the intake bottom dead center or later in Step S7, as shown in FIG. 11 at (d), a torque that is generated by the engine 20 can be maintained substantially constant by increasing the fuel injection amount in Step S8.

Furthermore, the ECU 44 maintains the phase of the closing timing of the intake valve 25 that was retarded in Step S7 and the fuel injection amount that was increased in Step S8 until the number of ignitions after detecting the occurrence of pre-ignition at Time t0 reaches 12 at Time t1, so that the inside of the combustion chamber 16 is sufficiently cooled, and also by suppressing the occurrence of pre-ignition for a sufficient period of time until the causes of pre-ignition such as adhered fuel or smoke are completely scavenged, the ECU 44 can suppress reoccurrence of pre-ignition due to the high temperature in the combustion chamber 16 or the residual ignition sources such as the adhered fuel or smoke when the phase of closing timing of the intake valve 25 and the fuel injection amount are reverted.

On the other hand, in Step S6, when determining that pre-ignition does not occur, proceeding to Step S11, the ECU 44 determines whether pre-ignition occurred or not based on the detection signals input from the vibration sensor 74 and the threshold value set in Step S2. Specifically, based on the detection signals input from the vibration sensor 74, the ECU 44 determines that knocking occurred when the vibration displacement of the engine 20 at the frequency 7 kHz or 13 kHz is greater than or equal to the second threshold value and less than the first threshold value, or when the timing at which the vibration displacement of the engine 20 at the frequency 7 kHz or 13 kHz became greater than or equal to the first threshold value and also the vibration displacement is greater than or equal to the first threshold value is the predetermined reference timing or later.

As a result of that, when determining knocking occurred, proceeding to Step S12, the ECU 44 retards the ignition timing by the predetermined amount and suppresses the occurrence of knocking.

In Step S11, when determining that knocking does not occur, or after Step S12, the ECU 44 terminates the process.

Next, with reference to FIG. 12, the pre-ignition detection and avoidance control performed by the control device of the engine 20 according to a second embodiment of the present invention will be described. FIG. 12 is a flow chart of the suppression-detection-avoidance control performed by the control device of the engine 20 according to the second embodiment of the present invention. The processes shown in FIG. 12 are repeatedly performed by the ECU 44 at a predetermined cycle when driving the vehicle. Moreover, since each process of Steps S21, S22, and S25 to S30 in the control of FIG. 12 is the same as each process of Steps S1, S2, and S7 to S12 in the control that was explained with reference to FIG. 7, redundant explanation will be omitted.

In the pre-ignition detection and avoidance control according to the second embodiment of the present invention shown in FIG. 12, in the state that pre-ignition does not occur, the divided injection is not performed and when detecting the occurrence of pre-ignition, the divided injection is performed.

Thus, after setting the threshold value (first threshold value) of the vibration displacement to determine the occurrence of pre-ignition and the threshold value (second threshold value) of the vibration displacement to determine the occurrence of knocking in Step S22, the ECU 44 determines in Step S23 whether pre-ignition occurred or not based on the detection signals input from the vibration sensor 74 and the threshold values set in Step S22. Specifically, based on the detection signals input from the vibration sensor 74, the ECU 44 determines that pre-ignition occurred when the vibration displacement of the engine 20 at the frequency 7 kHz or 13 kHz is greater than or equal to the first threshold value (the value of the detection signals is greater than or equal to 100 in the present embodiment), and when the timing at which the vibration displacement became greater than or equal to the first threshold value is earlier than the predetermined reference timing (the timing retarded by about 20 (deg) from the ignition timing of the cylinder 21 in the present embodiment).

As a result of that, when determining that pre-ignition occurred, proceeding to Step S24, the ECU 44 sets a plurality of fuel injection timings including the intake-stroke-early-half injection timing set at the early half of the intake stroke of the cylinder 21. For example, when determining that the necessary injection interval for the operation of the injector 28 can be secured, even though dividing the fuel injection in one cycle into three parts based on the engine speed or the temperature of the engine coolant obtained in Step S21, as shown in FIG. 6, the ECU 44 sets three timings as the fuel injection timing, which are the early half of the intake stroke of the cylinder 21, more specifically, the intake-stroke-early-half injection timing that is set in the vicinity of 300 (deg BTDC), the latter half of the intake stroke of the cylinder 21, more specifically, the intake-stroke-latter-half injection timing that is set in the vicinity of 260 (deg BTDC), and during the compression stroke of the cylinder 21, more specifically, the compression stroke injection timing that is set in the vicinity of 120 (deg BTDC). On the other hand, based on the engine speed or the temperature of the engine coolant obtained in Step S21, when determining that the necessary injection interval for the operation of the injector 28 cannot be secured, if dividing the fuel injection in one cycle into three parts, as shown in FIG. 6, the ECU 44 sets two timings as the fuel injection timing, which are the early half of the intake stroke of the cylinder 21, more specifically, the intake-stroke-early-half injection timing that is set in the vicinity of 300 (deg BTDC), and during the compression stroke of the cylinder 21, more specifically, the compression stroke injection timing that is set the vicinity of 120 (deg BTDC).

Next, further modifications according to the embodiment of the present invention will be explained. First, in the embodiment mentioned above, although it is explained that two independent intake ports 18 and two exhaust ports 19 are formed for each cylinder 21, a different number of the intake ports 18 and the exhaust ports 19 may be formed.

Moreover, in the embodiment mentioned above, although it is explained that the ECU 44 sets the operating state of the engine 20 based on the accelerator opening degree input from the accelerator opening degree sensor or the crank angle input from the crank angle sensor 70, it may set the operating state of the engine 20 using the detection signals input from other sensors.

Moreover, in the embodiment mentioned above, although it is explained that the total fuel injection amount in one cycle is set to be a lean state that the air fuel mixture is thinner than the theoretical air fuel ratio, the total fuel injection amount may be set to be the state that the air fuel mixture is equal to the theoretical air fuel ratio.

Furthermore, in the embodiment mentioned above, although it was explained that determining whether pre-ignition occurred or not may be based on the detection signals input from the vibration sensor 74, determining whether pre-ignition occurred or not may be performed by determining the combustion state by measuring an ion current in the combustion chamber 16 with an ion sensor (not shown).

Next, response effects of the control device of the engine 20 according to the embodiment of the present invention and the modification of the embodiment of the present invention mentioned above will be explained.

First, the tumble flow T is generated in the combustion chamber 16 by the intake port 18, when the operating state of the engine 20 is in the high-load, low-rotation range and pre-ignition easily occurs, the ECU 44 injects the fuel from the injector 28 at a plurality of the injection timings including the intake-stroke-early-half injection timing of the cylinder 21, so that, compared to a batch fuel injection from the injector 28, the fuel injection amount of each injection timing is suppressed, the penetration force in the fuel injection direction is reduced, and the fuel adhesion to the piston 14 or the wall surface of the combustion chamber 16 can be reduced. Moreover, since the fuel injection timing is divided into a plurality of timings, fuel can be injected at the timing at which the fuel adhesion to the piston 14 or the wall surface of the combustion chamber 16 is reducible. Especially, the fuel can be injected toward the tumble flow T by injecting the fuel at the intake-stroke-early-half injection timing, so that the penetration force in the injection direction of the injected fuel is reduced by the kinetic energy of the tumble flow T and the fuel adhesion to the wall surface of the combustion chamber 16 can be reduced effectively. Thereby, the fuel adhesion that becomes an ignition source to accelerate pre-ignition can be reduced certainly and pre-ignition can be suppressed and avoided certainly.

Moreover, since fuel is injected from the injector 28 at a plurality of the injection timings including the compression stroke injection timing when pre-ignition easily occurs, the inside of the combustion chamber 16 can be cooled with the latent heat of vaporization of fuel by injecting fuel at the compression stroke, so that it is possible to have the state in which pre-ignition less easily occurs.

Furthermore, when pre-ignition easily occurs, since fuel is injected from the injector 28 at a plurality of the injection timings including the intake-stroke-latter-half injection timing, fuel is injected at the timing at which the tumble flow T, which is generated at the early half of the intake stroke, is expanded in the vertical direction with a descent of the piston 14, the fuel adhesion to the wall surface of the combustion chamber 16 can be reduced by flowing the fuel in a spiral manner in the combustion chamber 16 by continuation of the tumble flow T, so that it is possible to have the state in which pre-ignition less easily occurs.

Moreover, by injecting fuel from the injector 28 toward the vortex center of the tumble flow T, the penetration force in the injection direction of the injected fuel is certainly reduced by the kinetic energy of the tumble flow T, the fuel adhesion to the wall of the combustion chamber 16 can be reduced effectively, and pre-ignition can be suppressed and avoided certainly.

Furthermore, since fuel injected from the injector 28 is injected toward the vortex center of the tumble flow T above a lower part of the tumble flow T, which flows obliquely upward toward the injector 28 side along the opposite injector side slope 54 of the piston crown surface 50, the fuel can be injected certainly toward the vortex center of the tumble flow T, so that the penetration force in the injection direction of the injected fuel is certainly reduced by the kinetic energy of the tumble flow T and the fuel adhesion to the wall surface of the combustion chamber 16 can be reduced effectively.

In addition, when detecting pre-ignition, while the inside of the combustion chamber 16 is cooled from the latent heat of vaporization of the increased fuel by increasing the fuel injection amount of the injector 28, the temperature in the combustion chamber 16 at the time of compression is decreased by retarding the closing timing of the intake valve 25 to the intake bottom dead center or later and reducing the effective compression ratio, so that pre-ignition can be avoided effectively. At this time, by increasing the fuel injection amount while retarding the phase of closing timing of the intake valve 25 to the intake bottom dead center or later, a decrease in generated torque by decreasing the effective compression ratio can be offset by an increases in generated torque by increasing the fuel injection amount, and torque that is generated by the engine 20 can be maintained substantially constant.

Moreover, after detecting pre-ignition, over a sufficient period of time until the predetermined number of ignitions are performed, the inside of the combustion chamber 16 is sufficiently cooled, and the adhered fuel or smoke causing pre-ignition is completely scavenged from inside of the combustion chamber 16, the injector 28 maintains the increased fuel injection amount, the valve drive mechanism 41 maintains the closing timing of the retarded intake valve 25, so that the occurrence of pre-ignition is suppressed. Thus, when reverting the phase of the closing timing of the intake valve 25 and the fuel injection amount, a larger pre-ignition, which is caused by the continuous occurrence of pre-ignition by high temperature in the combustion chamber 16 or the residual of ignition sources such as adhered fuel or smoke, can be certainly prevented.

Furthermore, when the operating state of the engine 20 is in the high-load, low-rotation range and when pre-ignition easily occurs, fuel is injected from the injector 28 at more injection timings than when the operating state of the engine is out of the high-load, low-rotation range and pre-ignition does not easily occur, so that compared to the case in which the operating state of the engine 20 is in the state in which pre-ignition does not easily occur, while the penetration force in the fuel injection direction is decreased by suppressing the fuel injection amount of each injection timing and the fuel adhesion to the piston 14 or the wall surface of the combustion chamber 16 can be reduced, the fuel can be injected at the timing that reduces the fuel adhesion to the piston 14 or the combustion chamber 16.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTER LIST

4 Turbo supercharger
10 Intake passage
11 Throttle valve
12 Crank shaft
14 Piston
16 Combustion chamber
18 Intake port 19 Exhaust port
20 Engine
21 Cylinder
22 Cylinder block
23 Cylinder head
24 Connecting rod
25 Intake valve
26 Ceiling
27 Exhaust valve
28 Injector
30 Exhaust passage
39 Ignition plug
40 Ignition circuit
41 Valve drive mechanism
42 Fuel supply system
44 ECU
50 Piston crown surface
52 Injector side slope
54 opposite injector side slope
70 Crank angle sensor
72 Water temperature sensor
74 Vibration sensor
100 Engine system
T Tumble flow

The invention claimed is:

1. A control system of an engine to control behavior of fuel that is directly injected into a combustion chamber of a cylinder, the control system comprising:
   a fuel injection valve for directly injecting the fuel into the combustion chamber; and
   an intake port of the engine for generating a tumble flow in the combustion chamber; and
   a control device configured to control the fuel injection valve to inject the fuel from the fuel injection valve at a plurality of injection timings including an intake-stroke-early-half injection timing that is set at an early half of an intake stroke of the cylinder and a compression stroke injection timing that is set during a compression stroke of the cylinder, when an operating state of the engine is in a high-load, low-rotation range,
   wherein the tumble flow is a longitudinal vortex flow of intake air that enters the combustion chamber from the intake port of the engine.

2. The control system of the engine according to claim 1, wherein the control device is configured to control the fuel injection valve to inject the fuel at a plurality of injection timings including an intake-stroke-latter-half injection timing that is set at a latter half of the intake stroke of the cylinder, when the operating state of the engine is in the high-load, low-rotation range.

3. The control system of the engine according to claim 1, wherein the control device is configured to control the fuel injection valve to inject the fuel toward a vortex center of the tumble flow at the intake-stroke-early-half injection timing.

4. The control system of the engine according to claim 1, wherein the fuel injection valve is arranged at an intake port side of a periphery of a ceiling of the combustion chamber and injects the fuel obliquely downward toward an exhaust port side of the engine from the intake port side, and an inclined surface is formed on a piston crown face of the engine to extend obliquely upward toward the fuel injection valve side from a side opposite from the fuel injection valve on the piston crown face.

5. The control system of the engine according to claim 1, wherein
   the control device is configured to detect an occurrence of pre-ignition in which an air fuel mixture spontaneously ignites before an ignition timing of the cylinder; and
   the control system further comprises a variable valve timing mechanism for changing a valve timing of an intake valve of the engine, wherein when pre-ignition is detected by the pre-ignition detection means, the fuel injection valve control means increases the fuel injection amount of the fuel injection valve and the variable valve timing mechanism retards a closing timing of the intake valve to an intake bottom dead center or later.

6. The control system of the engine according to claim 5, wherein after detecting the pre-ignition, the fuel injection valve maintains the increased fuel injection amount and the variable valve timing mechanism maintains the closing timing of the retarded intake valve until a predetermined number of ignitions are performed.

7. The control system of the engine according to claim 1, wherein when the operating state of the engine is out of the high-load, low-rotation range, the control device controls the fuel injection valve to inject the fuel at the injection timings including the intake stroke injection timing that is set at the intake stroke of the cylinder, and when the operating state of the engine is in the high-load, low-rotation range, the control device controls the fuel injection valve to inject the fuel at more injection timings than when the operating state of the engine is out of the high-load, low-rotation range.

8. The control system of the engine according to claim 1, wherein the control device controls the fuel injection valve to inject the fuel in a batch at an intake stroke injection timing, which is set at the intake stroke of the cylinder, when the operating state of the engine is not in the high-load, low-rotation range.

9. The control system of the engine according to claim 1, wherein the control device controls the fuel injection valve to inject the fuel in a batch at an intake stroke injection timing, which is in a vicinity of a crankshaft angle of 280 degrees before top dead center set in the intake stroke of a cylinder, when the operating state of the engine is not in the high-load, low-rotation range.

10. The control system of the engine according to claim 1, wherein the control device controls the fuel injection valve to inject the fuel by dividing fuel injection into three timings of the intake-stroke-early-half injection timing, an intake-stroke-latter-half injection timing, and the compression stroke injection timing, when the operating state of the engine in the high-load, low-rotation range.

11. The control system of the engine according to claim 10, wherein the intake-stroke-early-half injection is set in a vicinity of a crankshaft angle of 300 degrees before top dead center (deg BTDC), the intake-stroke-latter-half injection timing is set in a vicinity of a crankshaft angle of 260 deg BTDC, and the compression stroke injection timing is set in a vicinity of a crankshaft angle of 120 deg BTDC, when the operating state of the engine is in the high-load, low-rotation range.

12. The control system of the engine according to claim 10, wherein based on an engine speed or a temperature of an engine coolant, when determining that a necessary injection interval for operation of the fuel injection valve cannot be secured if the fuel injection in one cycle is divided into three parts, the control device injects the fuel by dividing the fuel injection into two timings that are the intake-stroke-early-half injection timing and the compression stroke injection timing, when the operating state of the engine is relatively in the high-load, low-rotation range.

13. The control system of the engine according to claim 12,
wherein the intake-stroke-early-half injection timing is set in a vicinity of a crankshaft angle of 300 degrees before top dead center (deg BTDC) and the compression stroke injection timing is set in a vicinity of a crankshaft angle of 120 deg BTDC, when the operating state of the engine is relatively in the high-load, low-rotation range.

14. A control system of an engine to control behavior of fuel that is directly injected into a combustion chamber of a cylinder, the control system comprising:
a fuel injection valve for directly injecting the fuel into the combustion chamber; and
an intake port of the engine for generating a tumble flow in the combustion chamber; and
a control device configured to control the fuel injection valve to inject the fuel from the fuel injection valve at a plurality of injection timings including an intake-stroke-early-half injection timing that is set at an early half of an intake stroke of the cylinder, when an operating state of the engine is in a high-load, low-rotation range,
wherein the tumble flow is a longitudinal vortex flow of intake air that enters the combustion chamber from the intake port of the engine;
wherein the fuel injection valve is arranged at an intake port side of a periphery of a ceiling of the combustion chamber and injects the fuel obliquely downward toward an exhaust port side of the engine from the intake port side, and an inclined surface is formed on a piston crown face of the engine to extend obliquely upward toward the fuel injection valve side from a side opposite from the fuel injection valve on the piston crown face; and
wherein the fuel injection valve is arranged at a slanted angle relative to the inclined surface on the piston crown face, the slanted angle being configured such that an axial line of a fuel spray of the fuel injected by the fuel injection valve during the early half of the intake stroke of the cylinder passes above an extending direction extending along the inclined surface of the piston crown face, such that the axial line of the fuel spray does not intersect with the extending direction within the combustion chamber.

* * * * *